US007001299B2

(12) United States Patent
Takagi et al.

(10) Patent No.: US 7,001,299 B2
(45) Date of Patent: Feb. 21, 2006

(54) CONTROL APPARATUS OF AUTOMATIC TRANSMISSION

(75) Inventors: Kiyoharu Takagi, Okazaki (JP); Akira Aikawa, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 105 days.

(21) Appl. No.: 10/808,303

(22) Filed: Mar. 25, 2004

(65) Prior Publication Data

US 2004/0248698 A1 Dec. 9, 2004

(30) Foreign Application Priority Data

Mar. 25, 2003 (JP) ............................ 2003-081967

(51) Int. Cl.
*F16H 31/00* (2006.01)

(52) U.S. Cl. ....................... 475/116; 475/118; 475/120; 475/121; 475/122; 475/123; 475/127; 477/154; 477/155; 477/156; 477/164; 701/58; 701/59; 192/3.57; 192/3.58; 192/3.63; 192/85 R; 192/85 AA

(58) Field of Classification Search ................ 475/116, 475/118, 120, 121, 122, 123, 127; 192/3.57, 192/3.58, 3.63, 85 AA, 85 R; 477/154, 155, 477/156, 164

See application file for complete search history.

(56) References Cited

U.S. PATENT DOCUMENTS

| | | | | |
|---|---|---|---|---|
| 5,911,647 | A * | 6/1999 | Kozaki et al. | 477/143 |
| 5,925,086 | A * | 7/1999 | Sakai et al. | 701/66 |
| 5,938,563 | A * | 8/1999 | Nishio et al. | 477/117 |
| 6,520,882 | B1 * | 2/2003 | Saito | 475/127 |
| 6,714,850 | B1 * | 3/2004 | Jeon | 701/59 |
| 6,872,166 | B1 * | 3/2005 | Takagi et al. | 477/117 |

FOREIGN PATENT DOCUMENTS

| | | |
|---|---|---|
| JP | 6-11026 | 1/1994 |
| JP | 9-287657 | 11/1997 |
| JP | 11-351365 | 12/1999 |

* cited by examiner

*Primary Examiner*—Charles A. Marmor

*Assistant Examiner*—David D. Le

(74) *Attorney, Agent, or Firm*—Buchanan Ingersoll PC

(57) ABSTRACT

According to an aspect of the present invention, an automatic transmission includes plural friction engaging elements configures plural shift ranges based on combinations of each friction engaging element being in engaging or disengaging condition, a controlling unit for controlling the friction engaging elements to be in engaging or disengaging condition by controlling a hydraulic pressure applied.

4 Claims, 7 Drawing Sheets

| | | C1 | C2 | C3 | B1 | B2 |
|---|---|---|---|---|---|---|
| R range | R | | | ○ | | ○ |
| N range | N | | | | | ○ |
| D range | N | | | | (○) | ○ |
| | First speed | ○ | | | | ○ |
| | Second speed | ○ | | | ○ | |
| | Third speed | ○ | | ○ | | |
| | Forth speed | ○ | ○ | | | |
| | Fifth speed | | ○ | ○ | | |
| | Sixth speed | | ○ | | ○ | |

○:Engaging, Empty:Disengaging

F I G. 5
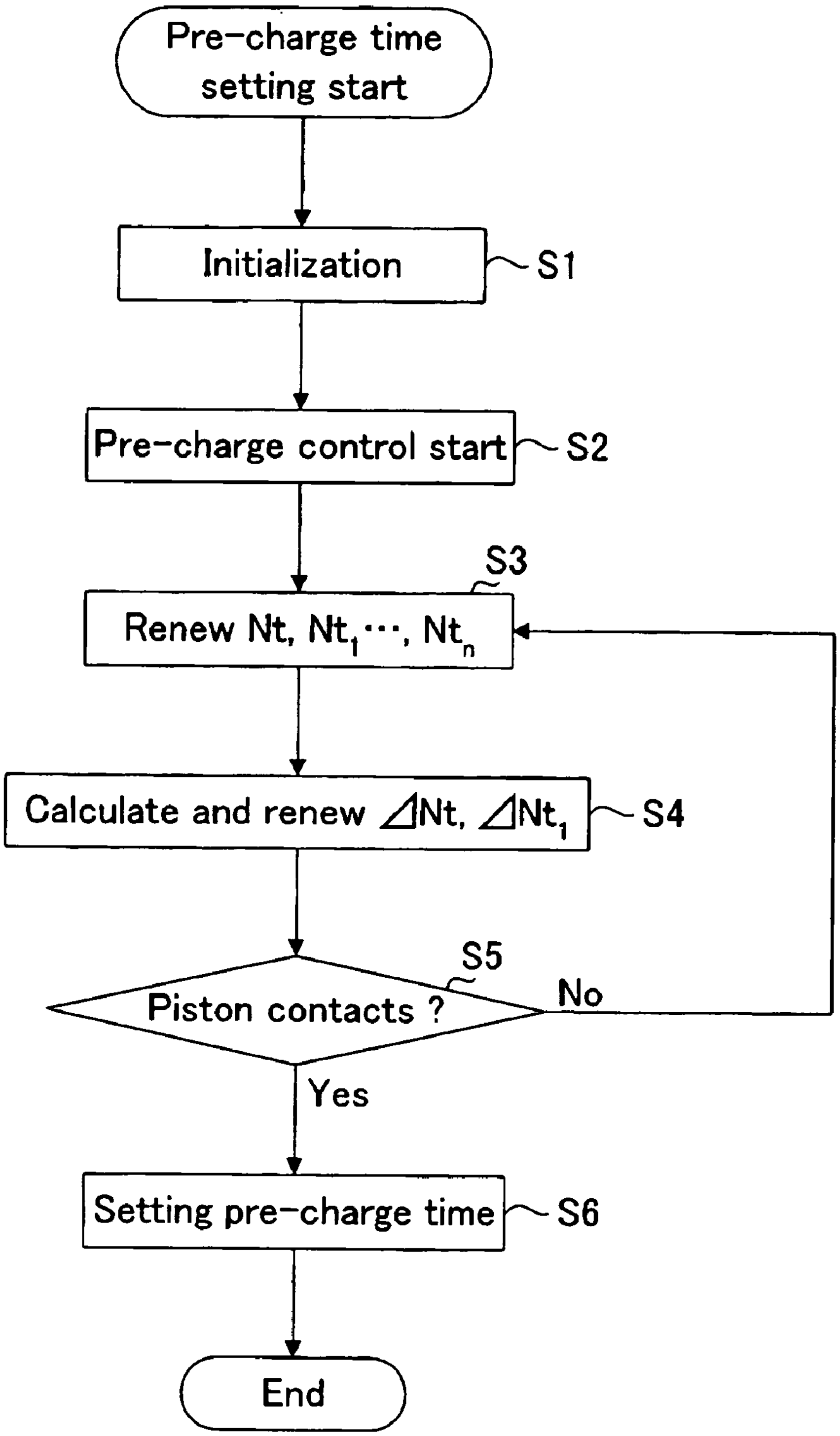

F I G. 7
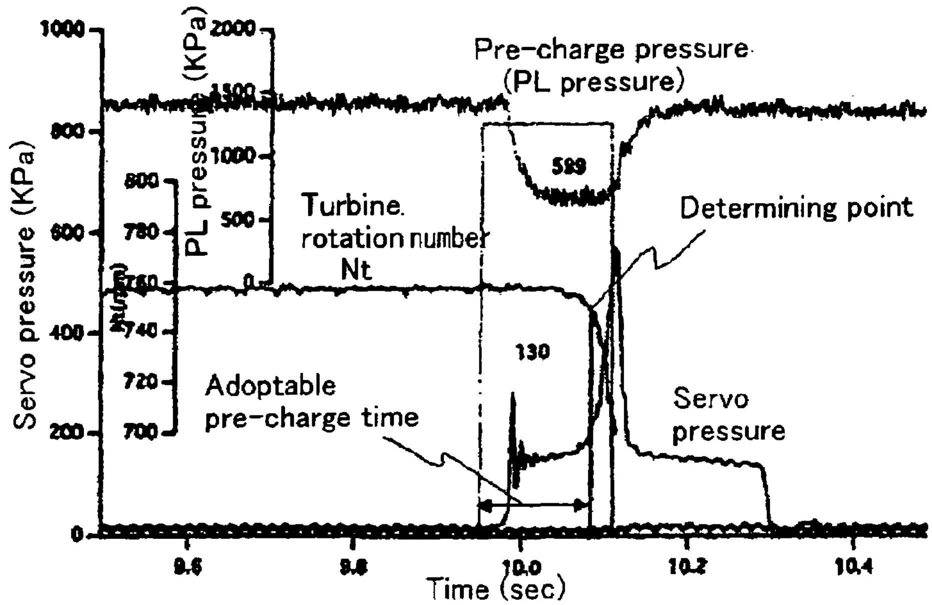
F I G. 8
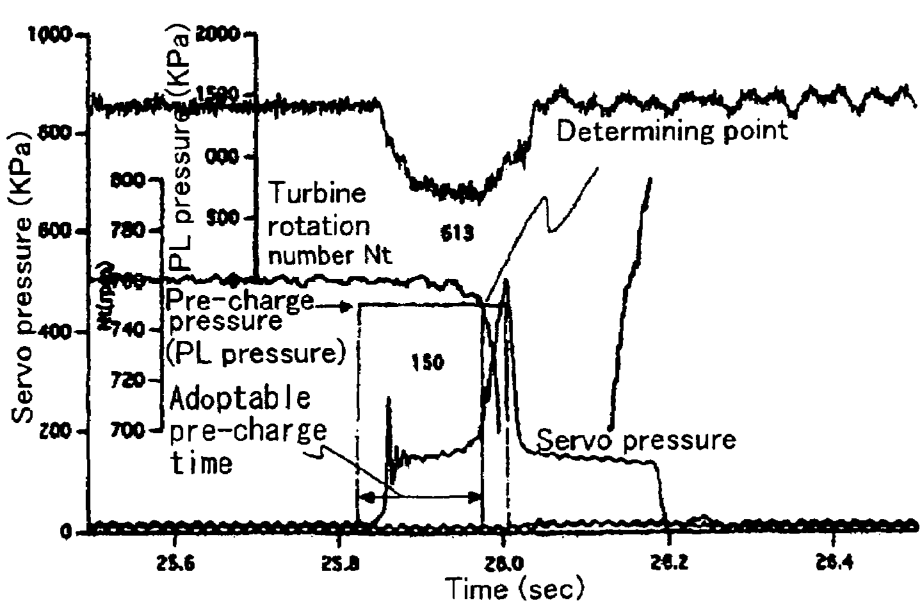

CONTROL APPARATUS OF AUTOMATIC TRANSMISSION

This application is based on and claims priority under 35 U.S.C. § 119 with respect to Japanese Application No. 2003-081967 filed on Mar. 25, 2003, the entire content of which is incorporated herein by reference.

FIELD OF THE INVENTION

This invention generally relates to an automatic transmission and a pre-charge time setting means for the automatic transmission.

BACKGROUND OF THE INVENTION

A known hydraulic pressure value controller for an automatic transmission directly controls a hydraulic pressure value from a hydraulic pressure source by an electromagnetic valve and the hydraulic pressure value provided to friction engaging elements (friction clutch and friction brake), then each friction engaging element becomes in engaged or disengaged condition.

Specifically, such clutch is controlled to move rapidly within an allowance range from the point where the clutch stars to be moved to the point where the clutch becomes in engaging condition, and further controlled to move slowly by shifting the connection speed once the clutch becomes in engaging condition. As shown in FIG. 11, in the allowance range of a first half of a piston stroke of a clutch piston (hereinbelow referred to as a piston), the friction engaging element is quickly filled with fluid (pre-charge) for increasing a piston speed. After a predetermined pre-charge time, the piston speed is decelerated to almost "zero" on the verge of that the friction engaging element becomes in engaging condition. Then, the piston speed needs to be maintained at a low speed corresponding to the low hydraulic pressure value (stand-by hydraulic pressure value) for keeping the piston at stand-by position. In this way, the automatic transmission needs to be more improved in terms of responsiveness and followability. Thus, the operation speed of transmission may be improved, at the same time, a shift shock may be prevented.

The shift shock will be occurred when the pre-charge pressure or pre-charge time is excess, and the responsiveness and followability will be poor when the pre-charge pressure or pre-charge time is short, so that the pre-charge pressure or pre-charge time need to be set preferably. If an appropriate acceleration time of the piston is set by the setting the pre-charge time preferably in response to the predetermined pre-charge pressure, especially at initial factory setting, individuality on each vehicle due to the environment or fluctuations of the automatic transmission, engine or electromagnetic valve will be reduced, and product quality will be secured.

To realize such pre-charge time control, a method to correctly detect a time when the piston engages with the clutch needs to be presented. As shown in FIG. 11, in normal transmission except a shift change when the vehicle start traveling (N→D, N→R), a rotation number of the input shaft is not changed until an inertia phase at which a rotation change arises inside the automatic transmission, so that an output shaft torque may be detected by a torque sensor in stead of the rotation number of the input shaft, but the fact is that such torque sensor is not used in terms of poor accuracy thereof and the fluctuation of the output shaft torque.

Meanwhile, methods for detecting inflection point of the input shaft rotation are disclosed in Japanese Patent Laid-Open Publications Tokukaihei 6-11026, Tokukaihei 11-351365 and Tokukaihei 9-287657. In Tokukaihei 6-11026, a means for determining an engaging starting point of a friction element used when the vehicle starts moving depending on a rotation number of a turbine is disclosed. In addition, a means for determining a transmission starting point when the rotation number being smaller than the maximum rotation number is detected twice in series is disclosed in Tokukaihei 11-351365. Furthermore, in Tokukaihei 9-287657, a means being combination of aforementioned two known means for determining a starting point of the inertia phase based on a predetermined percentage change of the rotation number obtained from a predetermined time and a predetermined rotation is disclosed.

However, if aforementioned three known means are used to detect the engaging point where the piston engages with the clutch, problems may be occurred that it becomes difficult to prevent the individual difference on each product because various thresholds need to be set based on temperature and each friction engaging element. For example, the preferable pre-charge time in response to the each of friction engaging elements, temperature and the pre-charge pressure may not be set on initial setting before shipment, so that the piston is engaged with the clutch really fast. In this case, the input shaft rotation changes quickly, furthermore, such change may differ depending on each friction engaging element, so that the various thresholds need to be set based on temperature and each friction engaging element.

FIG. 12 illustrates waveforms of each value related to the automatic transmission when the friction engagement element becomes engaged by the movement of the piston at the predetermined pre-charge pressure. It is clear from the actuation structure of the automatic transmission, the piston is pushed and moved by the hydraulic pressure to be engaged with the friction engaging element, then the piston strokes ends, and the torque is transmitted along with that the hydraulic pressure rapidly rises. It is also clear from waveforms in FIG. 12 that a slope of the declining line indicating the rotation number of the turbine, for example, is determined by a factor due to a structure of the friction engaging element. However, it is not sure that a transmitting starting point is obtained as a unique value by the aforementioned known means. Thus, the aforementioned known means may be preferable for determining the inflection point of the individual input shaft, however, there is a limit to practically use such known means for determining the point at which the piston engages with the clutch.

Furthermore, the inflection point of the hydraulic pressure as shown in FIG. 12 may be used as the point at which the piston is engaged with the clutch, in other words, a torque generating point, however, may not correspond to the inflection point of the hydraulic pressure due to various conditions, such as temperature, and various kinds of the friction engaging element.

In consideration of aforementioned problems, the present invention seeks to provide a pre-charge time setting means being high accuracy and applicable regardless of various conditions, such as individual difference between each product, temperature change or various characteristics of the friction engaging element, and a automatic transmission including such pre-charge time setting means.

SUMMARY OF THE INVENTION

According to an aspect of the present invention, an automatic transmission includes plural friction engaging elements configuring plural shift ranges based on combinations of each friction engaging element being in engaging or disengaging condition, a controlling unit for controlling the friction engaging elements to be in engaging or disengaging condition by controlling a hydraulic pressure applied thereto, comprising: a switching means for switching the condition of the controlling unit to a learning mode for leaning a pre-charge time at a predetermined pre-charge pressure, a means for determining the pre-charge time activated upon the learning mode based on input values indicating at least a turbine rotation number, wherein the means for determining the pre-charge time, on condition that a vehicle is not traveling, and the controlling portion is switched to the leaning mode includes a means for moving the friction engaging element toward engaging side by controlling the hydraulic pressure applied to the friction engaging element to be at the predetermined pre-charge pressure by the controlling portion while an input shaft rotating number of the automatic transmission is constant, a means for measuring and memorizing the input values with predetermined intervals in a predetermined determining cycle, and a means for learning and setting a current time as the pre-charge time when a change of the input value due to a decline of the turbine rotation number within the determining cycle fulfills a predetermined noise eliminating condition, and a differential between a current input value and a former input value and a differential between the former input value and a last but one input value exceed a predetermined threshold.

According to another aspect of the present invention, an automatic transmission further comprises an input means for detecting an engine rotation number, wherein the means for determining the pre-charge time uses a rotation number differential between the turbine rotation number and the engine rotation number as the input value.

According to still another aspect of the present invention, a method for setting the pre-charge time for an automatic transmission includes plural friction engaging elements configures plural shift ranges based on combinations of each friction engaging element being in engaging or disengaging condition, a controlling unit for controlling the friction engaging elements to be in engaging or disengaging condition by controlling a hydraulic pressure applied thereto, comprising: a process for determining the pre-charge time for determining the pre-charge time based on input values indicating at least a turbine rotation number, on condition that a vehicle is not traveling, a process for moving the friction engaging element toward engaging side by controlling the hydraulic pressure applied to the friction engaging element while the pre-charge time is set at the predetermined pre-charge pressure by the controlling portion when an input shaft rotating number of the automatic transmission is constant; wherein the process for determining the pre-charge time includes a process for measuring and memorizing the input values with predetermined intervals in a predetermined determining cycle, and a process for learning and setting a current time as the pre-charge time when a change of the input value due to a decline of the turbine rotation number within the determining cycle fulfills a predetermined noise eliminating condition, and a differential between a current input value and a former input value and a differential between the former input value and a last but one input value exceed a predetermined threshold.

According to still further aspect of the present invention, the process for determining the pre-charge time uses a rotation number differential between the turbine rotation number and the engine rotation number as the input value.

BRIEF DESCRIPTION OF THE DRAWING FIGURES

The foregoing and additional features and characteristics of the current invention will become more apparent from the following detailed description considered with reference to the accompanying drawing figures in which like reference numerals designate like elements and wherein:

FIG. 5 illustrates a flow chart of a setting process of a pre-charge time setting means according to the embodiment of the present invention;

FIG. 7 illustrates a graph indicating experimental results of an embodiment according to the present invention;

FIG. 8 illustrates a graph indicating experimental results of an embodiment according to the present invention;

DETAILED DESCRIPTION OF THE INVENTION

Figures 1, 2:
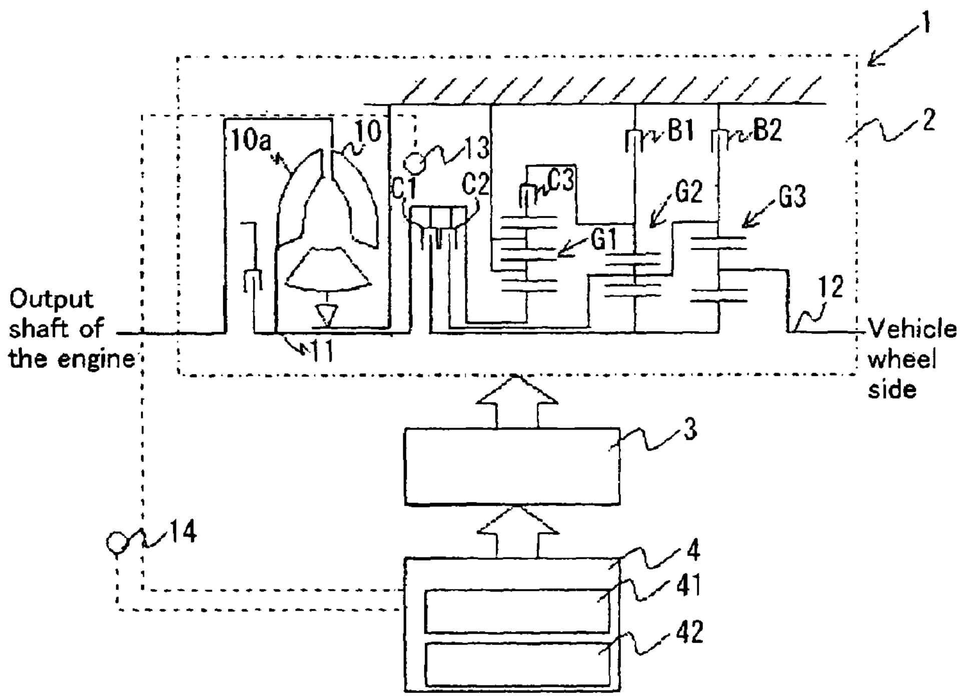
FIG. 1 illustrates a diagram showing a whole configuration of an automatic transmission in the embodiment according to the present invention.
FIG. 2 illustrates a diagram showing engaging or disengaging conditions of the friction engaging elements relative to transmission shifts.

A preferred embodiment of the present invention will be described hereinbelow in detail with reference to the accompanying drawings. FIG. 1 illustrates a whole configuration of an automatic transmission according to the embodiment of the present invention. According to FIG. 1, the automatic transmission 1 includes a transmission body 2, a hydraulic pressure controlling unit 3 and an electronic control unit 4.

The transmission body 2 includes an input shaft 11 connected to a turbine 10*a* of a torque converter 10, an output shaft 12 connected to wheel side, a double pinion planetary gear G1 and single pinion planetary gears G2 and G3 connected to the input shaft 11, friction clutches C1, C2 and C3 provided between the input shaft 11 and the double pinion planetary gear G1, the single pinion planetary gears G2 and G3, and friction brakes B1 and B2. In aforementioned configuration, engaging or disengaging combination among the friction clutches C1, C2 and C3, and the friction brake B1 and B2 is selected by the hydraulic pressure control unit 3 and the electronic control unit 4. Thus, a certain shift range can be selected as shown in FIG. 2.

Figure 3:
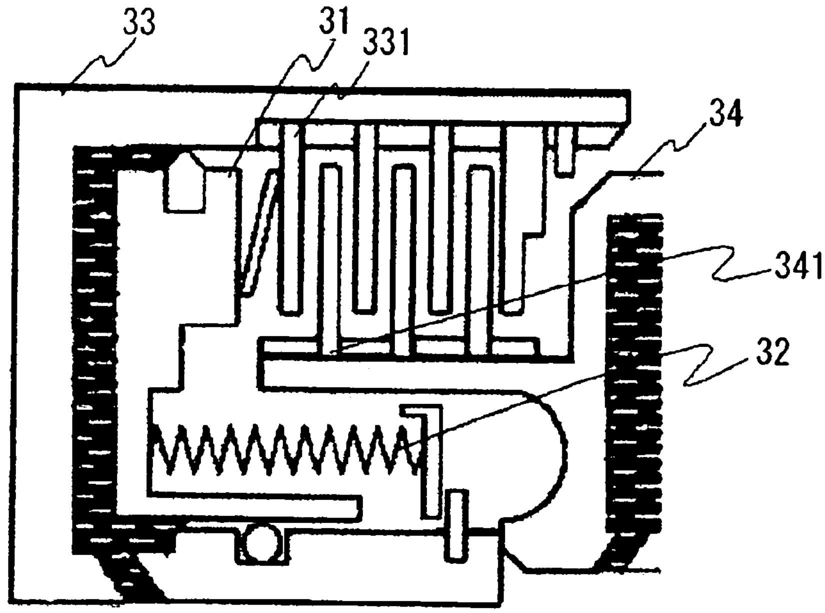
FIG. 3 illustrates a cross-sectional pattern diagram of a multi plate wet clutch as an example of the friction engaging elements.

FIG. 3 illustrates a pattern diagram of a multi plate wet clutch shown as an example of the friction engaging element. As shown in FIG. 3, each clutch includes a piston 31, a return spring 32 generating a reaction force against the piston 31, driven plates 331 fitted in a clutch drum 33 side, and drive plates 341 fitted in a clutch hub 34 side. Once the hydraulic control unit 3 increases the hydraulic pressure, the piston 31 is pressed against each plate side, and a friction is generated between each driven plate 331 and each drive plate 341, then the each driven plate 331 engages with the each drive plate 341, as a result, a turbine rotating number Nt is decreased. On the other hand, the hydraulic control unit 3 decreases the hydraulic pressure, the piston 31 is pushed back due to the reaction force of the return spring 32, then the each driven plate 331 disengages from the each drive plate 341.

Based on the instruction from the electronic control unit 4, the hydraulic control unit 3 switches an inner hydraulic circuit, selects an appropriate friction engaging element, controls the hydraulic pressure provided into the clutch, as a result, the friction engaging element becomes engaging or disengaging condition.

The electronic control unit 4 includes a computer for driving the hydraulic control unit 3 based on an input value from various sensors including a turbine rotating sensor 13 for detecting the turbine rotation number Nt of the input shaft 11 (turbine 10*a*) and a position sensor 14 for detecting the position of the selector lever operated by a driver. In addition, the electronic control unit 4 includes computer programs of a leaning mode switching means 41 for switching the condition of the hydraulic control unit 3 to an operation mode for leaning the pre-charge time, and a pre-charge time determining means 42 for setting the pre-charge time. Once a predetermined operation being detectable by the computer in the electronic control portion 4, the leaning mode switching means 41 starts an after-mentioned setting process for the pre-charge time.

A method for setting the pre-charge time relative to the friction clutch C3 will be explained. Firstly, the condition of the vehicle is set as follows. The vehicle is not traveling (the output shaft 12 is fixed) while the engine starts, and the aforementioned program for setting the stand-by hydraulic pressure starts. Then, the select lever is shifted from N range (the friction brake B2 is engaging) to R range (the friction clutch C3 engages with the friction brake B2). In this condition, the electronic control unit 4 controls the friction brake B2 to be in engaging condition through the hydraulic pressure control unit 3. As aforementioned above, the N ranges is a neutral condition in which the friction brake B2 is in engaging condition, so that the electronic control portion 4 maintains such neutral condition.

Then, the electronic control unit 4 outputs a driving signal through the hydraulic control unit 3 for controlling the hydraulic pressure of the friction clutch C3 becomes at a predetermined pre-charge pressure.

Figure 4:
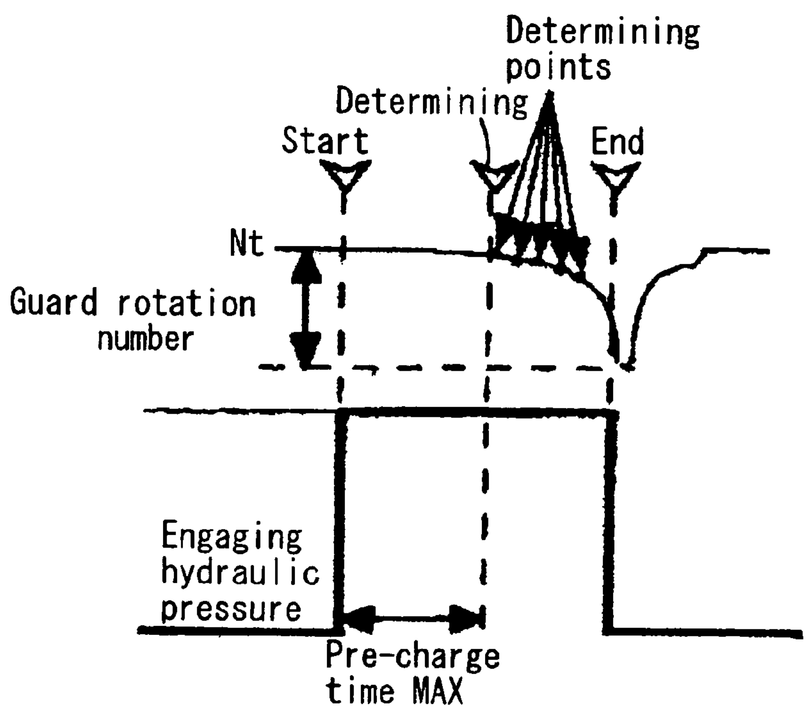
FIG. 4 illustrates a graph indicating a change of the turbine rotation number Nt and a hydraulic pressure wave form used in the present invention.

FIG. 4 illustrates a graph showing a hydraulic pressure waveform obtained by the aforementioned control and the turbine rotation number Nt. As shown in FIG. 4, the electronic control unit 4 executes the aforementioned driving control, at the same time, the electronic control unit 4 monitors the turbine rotation number Nt per predetermined measuring cycle being, for example, 5 msec interval. Then the electronic control unit 4 detects whether or not the piston is engaged with the clutch, and the point of time is determined as the pre-charge time.

The aforementioned determining process will be explained in detail in reference to FIG. 5. The electronic control unit 4 executes a predetermined initializing process (Step S1), starts to control by the predetermined pre-charge time (Step S2), replaces Nt, $Nt_1$, . . . $Nt_{n-1}$ of a former cycle with $Nt_1$, $Nt_2$ . . . Ntn for memorize the input value Nt in a predetermined n cycle, and memorizes an input value Nt of a current cycle (Step S3) then, the electronic control unit 4 replaces $\Delta Nt_1$ with the former differential value $\Delta$Nt and memorizes $\Delta Nt_1$. At the same time, the electronic control unit 4 calculates a difference between the input value Nt of the current cycle and the input vale $Nt_n$ of a predetermined cycle before, then memorizes the difference as the difference value $\Delta$Nt (Step S4). Finally, each obtained value is compared as follows.

(1) $\Delta$Nt<threshold Nt_th (e.g. −5 rpm)

(2) $\Delta Nt_1$<threshold Nt_th (e.g. −5 rpm)

(3) Nt is continuously decreasing more than or equal to a predetermined m times. (e.g. m=5)

($Nt<Nt_1$, $<Nt_2<$ . . . $Nt_m$)

If the aforementioned conditions are all true (all 1 through 3), it is confirmed that the piston is engaged with the clutch (Step S5). The aforementioned condition (3) is for preventing misjudge due to noise and the like. Through the determining process, if it is confirmed that the piston engages with the clutch, the time between the pre-charge control starting point to the time when the piston engages with the clutch is learned as a maximum pre-charge time (Step S7).

On the other hand, if the aforementioned conditions are not true, the process from Step S3 to Step S5 is repeated.

Figure 6:
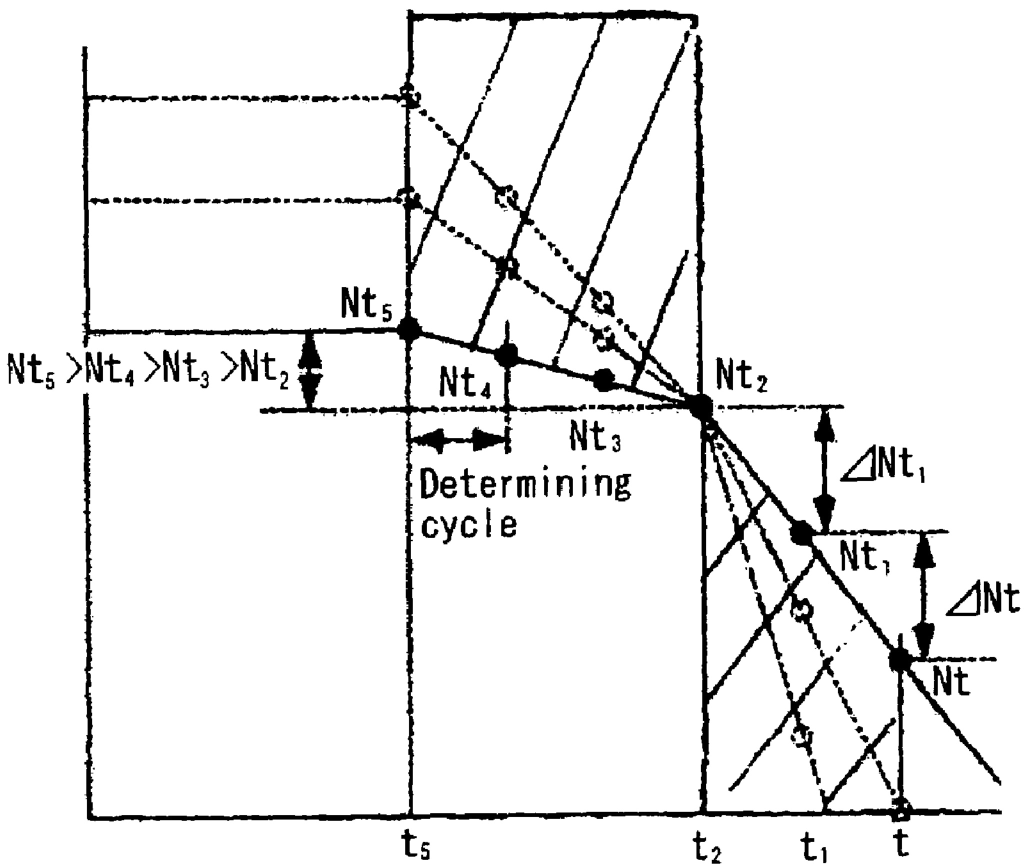
FIG. 6 illustrates an explanation diagram of an example of determining conditions, which indicating a change of the turbine rotation number near a point at which a piston end is determined.

FIG. 6 illustrates a graph indicating decreasing condition of the turbine rotating number Nt near the piston end. As shown in FIG. 6, a solid line connecting small black circles (Nt, $Nt_1$, $Nt_2$ . . . $Nt_n$) is a line connecting plural determining limit points for detecting a sharp decline of the turbine rotation number Nt which indicates that the piston is engaged with the clutch. In other word, when the turbine rotation number Nt continuously declines in a shaded area, it is determined that the piston is engaged with the clutch. It is determined from FIG. 6 that the piston is engaged with the clutch when a changing rate (decline) being equal to or less than a value obtained from the following formula is generated at this point;

Nt_th(rpm)/determining cycle t (sec)

FIG. 7 through FIG. 10 illustrate graphs indicating the turbine rotation numbers and a servo pressures (hydraulic pressure) when the piston is rapidly engaged with the clutch under conditions as follows;

determining cycle of the electronic control unit 4=5 msec threshold=−5 rpm continuing declining number of Nt=5 times (aforementioned condition (3))

Figure 9:
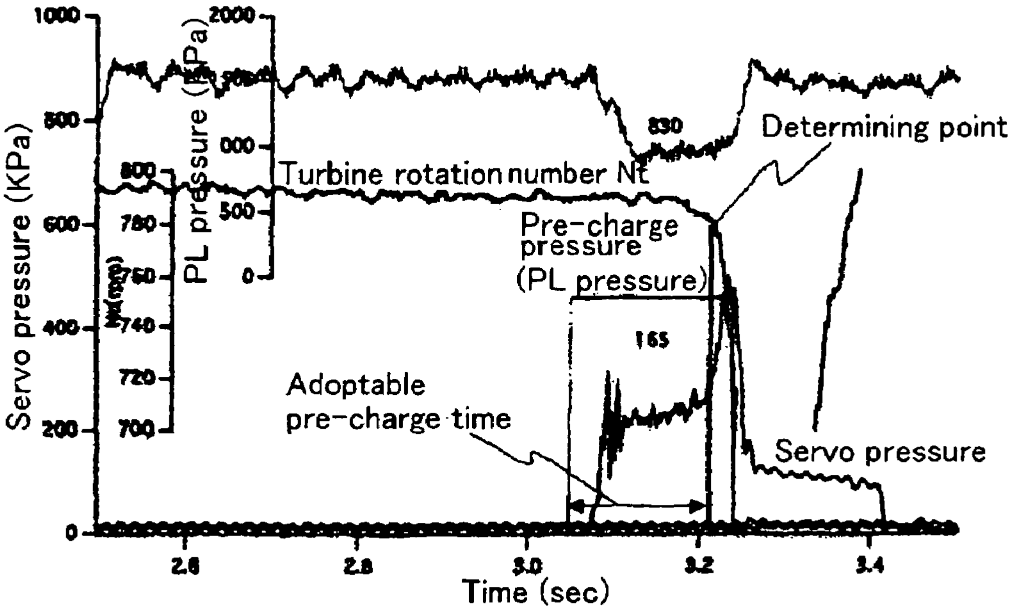
FIG. 9 illustrates a graph indicating experimental results of an embodiment according to the present invention.
Figure 10:
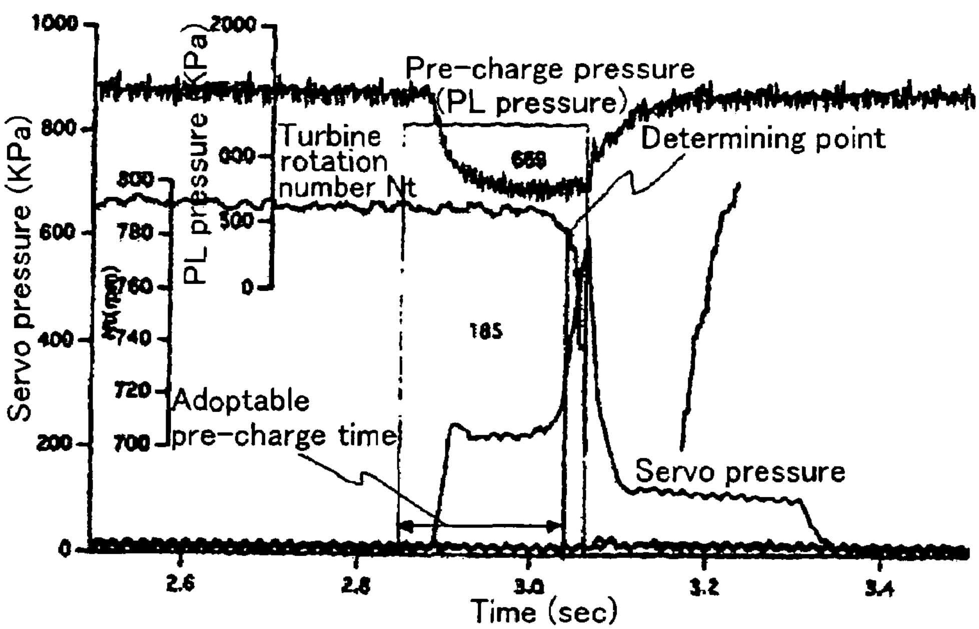
FIG. 10 illustrates a graph indicating experimental results of an embodiment according to the present invention.
Figure 11:
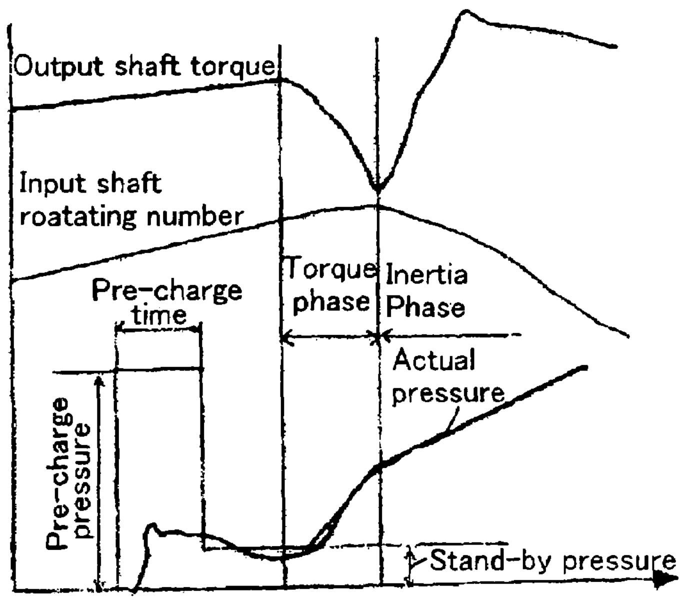
FIG. 11 illustrates a graph indicating a wave form of the hydraulic pressure when the automatic transmission is shifted up.
Figure 12:
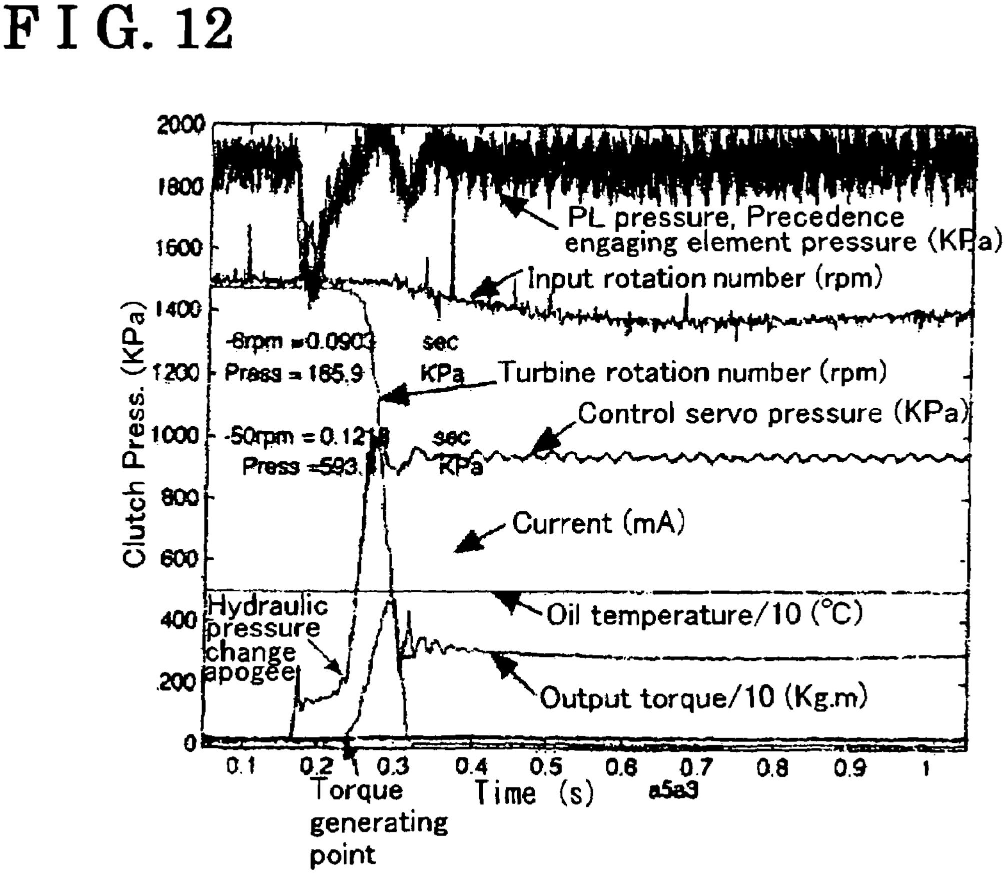
FIG. 12 illustrates a graph indicating waveforms when the friction engaging elements are rapidly moved and engaged upon a predetermined pre-charge pressure.

FIG. 7 illustrates a result from determining a piston engaging point of the friction brake B1 when the hydraulic temperature is 80° C., and the input rotation number is 800 rpm. The determining point in FIG. 7 under aforementioned condition is approximately corresponding with the inflection point of the hydraulic pressure. In the same manner as FIG. 7, FIG. 8 illustrates a result from determining a point at which the piston engages with the friction clutch B1 where different pre-charge pressure is applied. FIG. 9 illustrates a result from determining a point at which the piston engages with the friction clutch C1, and FIG. 10 illustrates a result from determining a piston engaging point of the friction engaging element C3. It is found from FIG. 7 trough FIG. 10 that the point at which the piston is engaged with the clutch is determined with the same threshold and the determining cycle even if the friction engaging elements or the pre-charge pressure are different. In addition, each point obtained by the current invention is closely related to the actual torque generating point.

In the embodiment of the current invention, the turbine rotation number Nt is used as an input value. However, it is preferred that the input value is calculated from the formula $|Nt-Ne|$ considering the change of the engine rotation if the friction engaging element shows a little rotation change, the pre-charge pressure is low and the engine rotation change is large. In this case, the inequality sign in each condition (1) through (3) will be reversed, and the threshold value will be a plus number.

In the experimental results in FIG. 7 through FIG. 10 according to the current embodiment, the embodiment of the current invention, the determining cycle is set to 5 msec, and the threshold is set to −5 rpm as a one of the preferable embodiment of the current invention, however, these predetermined values may be changed.

According to the current invention, an accurate precharge time can be set according to the predetermined pre-charge pressure by eliminating the individual difference between each vehicle. In addition, the current invention is rarely affected by various conditions, such as the vehicle, the automatic transmission, temperature and the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. An automatic transmission including plural friction engaging elements configures plural shift ranges based on combinations of each friction engaging element being in engaging or disengaging condition and a controlling unit for controlling the friction engaging elements to be in engaging or disengaging condition by controlling a hydraulic pressure applied thereto, comprising:

a switching means for switching the condition of the controlling unit to a learning mode for learning a pre-charge time at a predetermined pre-charge pressure;

a means for determining the pre-charge time activated upon the leaning mode based on input values indicating at least a turbine rotation number, wherein the means for determining the pre-charge time on condition that a vehicle is not traveling and the controlling unit is switched to the learning mode, includes:

a means for moving the friction engaging element toward engaging side by controlling the hydraulic pressure applied to the friction engaging element to be at the predetermined pre-charge pressure by the controlling portion while an input shaft rotating number of the automatic transmission is constant;

a means for measuring and memorizing the input values with predetermined intervals in a predetermined determining cycle; a means for learning and setting a current time as the pre-charge time when a change of the input value due to a decline of the turbine rotation number within the determining cycle fulfills a predetermined noise eliminating condition and a differential between a current input value and a former input value and a differential between the former input value and an input value preceding the former input value exceed a predetermined threshold.

2. An automatic transmission according to claim 1 further comprising an input means for detecting an engine rotation number, wherein the means for determining the pre-charge time uses a rotation number differential between the turbine rotation number and the engine rotation number as the input value.

3. A method for setting the pre-charge time for an automatic transmission including plural friction engaging elements configures plural shift ranges based on combinations of each friction engaging element being in engaging or disengaging condition, a controlling unit for controlling the friction engaging elements to be in engaging or disengaging condition by controlling a hydraulic pressure applied thereto, comprising:

determining the pre-charge time based on input values indicating at least a turbine rotation number on condition that a vehicle is not traveling;

moving the friction engaging element toward engaging side by controlling the hydraulic pressure applied to the friction engaging element while the pre-charge time is set at a predetermined pre-charge pressure by the controlling unit when an input shaft rotating number of the automatic transmission is constant;

wherein the process for determining the pre-charge time includes:

measuring and memorizing the input values with predetermined intervals in a predetermined determining cycle;

learning and setting a current time as the pre-charge time when a change of the input value due to a decline of the turbine rotation number within the determining cycle fulfills a predetermined noise eliminating condition, and a differential between a current input value and a former input value and a differential between the former input value and an input value preceding the former input value exceed a predetermined threshold.

4. A method for setting a pre-charge time according to claim 3, wherein the process for determining the pre-charge time uses a rotation number differential between the turbine rotation number and an engine rotation number as the input value.

* * * * *